United States Patent
Bitterlich

(10) Patent No.: US 8,737,367 B2
(45) Date of Patent: *May 27, 2014

(54) METHOD FOR THE SPONTANEOUS DISTRIBUTION OF DATA, AND CORRESPONDING DATA NETWORK

(75) Inventor: Jean-Yves Bitterlich, München (DE)

(73) Assignee: Siemens Enterprise Communications GmbH & Co. KG, Munich (DE)

(*) Notice: Subject to any disclaimer, the term of this patent is extended or adjusted under 35 U.S.C. 154(b) by 1576 days.

This patent is subject to a terminal disclaimer.

(21) Appl. No.: 11/663,866

(22) PCT Filed: Sep. 22, 2005

(86) PCT No.: PCT/EP2005/054742
§ 371 (c)(1),
(2), (4) Date: Mar. 27, 2007

(87) PCT Pub. No.: WO2006/034987
PCT Pub. Date: Apr. 6, 2006

(65) Prior Publication Data
US 2007/0258426 A1 Nov. 8, 2007

(30) Foreign Application Priority Data
Sep. 29, 2004 (DE) .......... 10 2004 047 364

(51) Int. Cl.
*H04L 12/56* (2011.01)
(52) U.S. Cl.
USPC ........... 370/338; 370/352; 370/328; 370/467; 370/330; 370/250; 455/450; 455/418; 455/419; 455/466; 455/557
(58) Field of Classification Search
USPC .......... 370/338, 349, 395, 328, 352; 455/557, 455/41.2, 553, 552.1, 418–419, 517, 422
See application file for complete search history.

(56) References Cited

U.S. PATENT DOCUMENTS

| | | |
|---|---|---|
| 5,790,536 A | 8/1998 | Mahany et al. |
| 5,909,437 A | 6/1999 | Rhodes et al. |

(Continued)

FOREIGN PATENT DOCUMENTS

| | | |
|---|---|---|
| DE | 10319317 A1 | 12/2004 |
| DE | 10353851 A1 | 6/2005 |

(Continued)

OTHER PUBLICATIONS

Hung-Yu Wei, Richard D. Gitlin; "Two-Hop-Relay Architecture for Next-Generation WWAN/WLAN Integration"; IEEE Wireless Communications; Apr. 2004; pp. 24-30; XP-001196396; IEEE Service Center, Piscataway, New Jersey, US.

(Continued)

*Primary Examiner* — Kiet Doan
*Assistant Examiner* — Michael T Vu
(74) *Attorney, Agent, or Firm* — Buchanan Ingersoll & Rooney PC

(57) ABSTRACT

In one aspect, a data network is provided. The data network includes a first user and a second user, a central device, data and a spontaneous communication connection. The first and second users are each ad hoc capable. The central device provides a distribution of data such that data is transmitted from the central device to the first user. The spontaneous communication connection is established between the first and second users and the data is transmitted directly from the first user to the second user via the spontaneous communication connection.

18 Claims, 1 Drawing Sheet

(56) References Cited

U.S. PATENT DOCUMENTS

| | | | |
|---|---|---|---|
| 6,378,069 B1 | 4/2002 | Sandler et al. | |
| 6,754,484 B1 * | 6/2004 | Hiltunen et al. | 455/412.1 |
| 7,058,722 B2 | 6/2006 | Ikami et al. | |
| 7,136,371 B2 * | 11/2006 | Du et al. | 370/349 |
| 7,305,254 B2 * | 12/2007 | Findikli | 455/557 |
| 2003/0022663 A1 | 1/2003 | Rajaram et al. | |
| 2003/0033525 A1 | 2/2003 | Rajaram | |
| 2003/0064717 A1 | 4/2003 | Rajaram | |
| 2004/0147223 A1 * | 7/2004 | Cho | 455/41.2 |
| 2004/0192274 A1 * | 9/2004 | Vuori | 455/418 |
| 2005/0152396 A1 * | 7/2005 | Pichna et al. | 370/467 |

FOREIGN PATENT DOCUMENTS

| | | |
|---|---|---|
| EP | 1347623 A1 | 9/2003 |
| EP | 1 401 224 A1 | 3/2004 |
| EP | 1 435 743 A1 | 7/2004 |
| WO | 0042795 | 7/2000 |
| WO | 02078284 A2 | 10/2002 |

OTHER PUBLICATIONS

Klaus Moessner, Seiamah Vahid, Rahim Tafazolli; "Software download enabling terminal reconfigurability"; May 2002; pp. 457-479; XP-001122781; Annals of Telecommunications, Get Lavoisier, Paris, France.

"3$^{rd}$ Generation Partnership Project; Technical Specification Group Services and System Aspects; Support of Push Service (Release 5)"; 3GPP TR 23.875 V5.1.0; Mar. 2002; pp. 1-70; XP-014021954; ETSI Standards, European Telecommunications Standards Institute, Sophia-Antipo, France.

PCT Search Report.

* cited by examiner

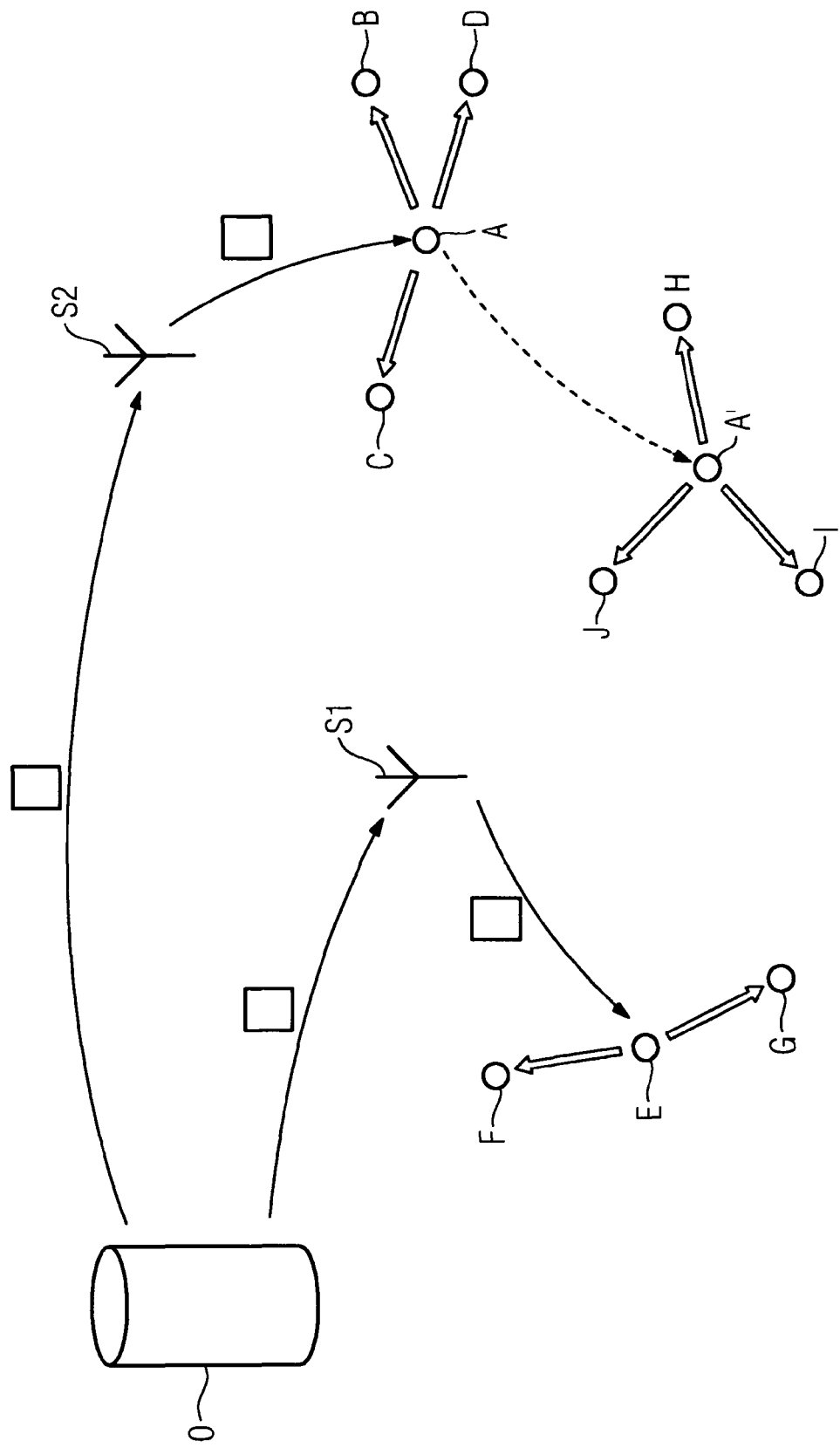

METHOD FOR THE SPONTANEOUS DISTRIBUTION OF DATA, AND CORRESPONDING DATA NETWORK

CROSS REFERENCE TO RELATED APPLICATIONS

This application is the U.S. National Stage of International Application No. PCT/EP2005/054742, filed Sep. 22, 2005 and claims the benefit thereof. The International Application claims the benefits of German application No. 102004047364.1 DE filed Sep. 29, 2004, both of the applications are incorporated by reference herein in their entirety.

FIELD OF INVENTION

The invention relates to a method for the distribution of data, especially software and/or configuration data, in a data network having several users, said users having ad hoc network capability. Furthermore, the present invention relates to a corresponding data network having users with ad hoc network capability and a central device for distribution of the data.

BACKGROUND OF INVENTION

Software management plays a central role with each mobile radio network operator or network operator. Where there are several million users, the operators are faced with an enormous problem, i.e. it must be possible to change and update configurations at all terminals simultaneously or within a clear time frame. Whereas the standards committees focus on how the updating and changing of configurations is to be managed at the network end and implemented at the terminal end, the way in which operators are to deal with the plurality of triggers and connections for updating and changing is very often ignored.

With the software management according to "SyncML/DM", a standard of the QMA, the software distribution takes place as necessary with the aid of an SMS trigger. The operator transmits an SMS to millions of terminals in order to trigger or activate them to contact a configuration management server. This solution is however very expensive and requires a very high bandwidth.

With the "enterprise networking" data network, there are several SNMP-based solutions corresponding to a standard of the IETF.

SUMMARY OF INVENTION

In this case, the individual stations react to specific multicast/broadcast packets. This solution is useful for small networks but not suitable for a network the size of that of mobile radio operators.

An object of the present invention is therefore to provide a method by means of which the configurations of a plurality of terminals can be more easily updated or changed. Furthermore, a corresponding data network is to be specified.

According to the invention, this object is achieved by a method for distributing data, especially software and/or configuration data, in a data network having several users that are ad hoc network capable, transmitting the data from a central device to a first of several users, establishing a spontaneous communication connection between the first and the second user and transmitting the data from the first user to the second user by way of a spontaneous communication connection.

Furthermore, provision is made according to the invention for a data network with at least a first and a second user that are ad hoc network capable and a central device for distributing data, especially software and/or configuration data, with it being possible to transmit the data from the central device to the first user, to establish a spontaneous communication connection between the first user and the second user and to transmit the data directly from the first user to the second user by way of the spontaneous communication connection.

In an advantageous manner, it is thus possible that the operator no longer needs to trigger all devices or users for the updating or changing of configurations or software. They only need to send software or configuration data to a subset of users, preferably in selected radio cells. The data is further distributed by spontaneous communication, i.e. ad hoc networks. This saves energy and bandwidth, and therefore money.

The transmission of data can take place automatically by the first user if he establishes the spontaneous communication or ad hoc network with the second user. This means that the first user is the active part and the second user merely has to decide whether he already has the data available and discard it as necessary.

As soon as one of the several users has a complete data subset available, an installation or setup can be started with him. This means that the user does not have to bother with the installations and setups.

The spontaneous communication is preferably checked by means of a security device. To this end, a signature of the central device and/or of the operator or a device manufacturer of mobile telephones for example can in particular be transmitted. This guarantees increased security with regard to the authenticity of data for installation procedures.

Spontaneous communication can be established by means of Bluetooth, wireless USB or WLAN. This therefore enables known standards to be used.

BRIEF DESCRIPTION OF THE DRAWING

The present invention is now explained in more detail with reference to the accompanying drawing, which in principle mirrors a data network according to the invention.

DETAILED DESCRIPTION OF INVENTION

The exemplary embodiment explained in more detail in the following represents a preferred embodiment of the present invention.

The solution according to the invention is based on a P2P software management distribution principle (peer-to-peer). In this process, the data required for updating or changing the software or configuration is sent from a centre via a wide-area data network to "selected" devices and then via ad hoc networks through spontaneous communication from the "selected" devices to other devices.

This means that the distribution principle is arranged in a manner similar to the propagation phenomena of viruses. Furthermore, the fact that spontaneous communication connections with a shorter range are increasingly provided for mobile telephone networks is also utilized.

The basic idea for data distribution according to the invention is to transmit an updated set of parameters or a new configuration to a critical and well-distributed mass of devices by using the known device positions. For example, the position of a cell in which the mobile radio device is located is sufficient as a device position.

It is to be assumed that the users move within the cell and if necessary leave the cell. If a user repeatedly carries out spontaneous communication with adjacent users, the "message" and/or new configuration is spread in this way. To this end, the terminals must naturally be designed to forward the message to other devices. Connection technologies such as Bluetooth, WLAN, wireless USB etc, are suitable.

Security is also usually of greatest importance for spontaneous communication. It must be ensured that the data originates from an authentic source. For this purpose, each connection and each exchange of data between terminals can, for example, be protected by a recognized signature of the operator or of the manufacturer.

In an advantageous manner, the method according to the invention can be performed at two different logic levels, i.e. the operator level and the terminal level. This means that operator-specific data of the network operator can be distributed at operator level and data that is specific to manufacturers of terminals can be distributed on the other hand at terminal level.

The method according to the invention can be used both for simple parameters and for complex data regardless of the distribution level.

In the example in the FIGURE, the operator O makes a data record available by means of which users A to J can reconfigure a mobile radio network.

The data record is symbolized in the FIGURE by a rectangle. It is to be distributed to all users A to J in the manner of a virus. In the actual example, the operator O transmits the data record to a transmitting station S1 and to a transmitting station S2 (solid arrows in the FIGURE). For simplicity, only two transmitting stations, that for example each supply one cell, are shown. Transmitting station S1 transmits the data record via the data network to a user or terminal E (also shown by a solid arrow). In the same way, transmitting station S2 transmits the data record to a user A. Both the user A and user E establish ad hoc networks, i.e. spontaneous communication connections (shown by double-line arrows in the FIGURE) with neighboring users or terminals, because they have available the data records to be distributed. In the actual case, the user E transmits the data record via a spontaneous communication connection to users F and G. In a similar manner, user A transmits the data record to users B, C and D.

A precondition for the distribution of the data record is that the individual users move, as already shown above. In this example, user A moves to a position A', (arrow shown by broken line in the FIGURE). There he comes into the vicinity of users H, I and J with which he can set up a spontaneous communication connection with a shorter range. By means of this connection, user A or A' transmits the data records also to these users H, I and J.

The data record is distributed according to the invention such that a user who is in possession of the data record to be distributed forwards it, or offers it, to the neighboring user. If the users addressed by the spontaneous communication already have the data record, they can refuse reception or reject the newly received data record.

LIST OF REFERENCE CHARACTERS

A-J Users
A' User at new position
O Operator
S1, S2 Transmitting station

The invention claimed is:

1. A method for distributing configuration data or update data in a data network having a plurality of terminal devices, the terminal devices having an ad hoc network capability, the configuration data or update data comprising a data set having a first data portion and a second data portion, the method comprising:
    transmitting the configuration data or update data from a central device to a first terminal device of the plurality of terminal devices;
    the first terminal device establishing a first spontaneous wireless communication connection between the first terminal device and a second terminal device of the plurality of terminal devices when the first terminal device is within a communicatable distance of the second terminal device;
    the first terminal device establishing a second spontaneous wireless communication connection between the first terminal device and a third terminal device of the plurality of terminal devices when the first terminal device is within a communicatable distance of the third terminal device;
    transmitting the configuration data or update data from the first terminal device directly to the second terminal device via the first spontaneous wireless communication connection;
    transmitting the configuration data or update data from the first terminal device directly to the third terminal device via the second spontaneous wireless communication connection;
    the third terminal device installing the configuration data or the update data; and
    the second terminal device installing the configuration data or update data.

2. The method as claimed in claim 1, wherein the transmission of the configuration data or update data to the second terminal device automatically occurs via the first terminal device after the first spontaneous wireless communication connection is established.

3. The method as claimed in claim 2, wherein the second terminal device has the second data portion of the configuration data or update data and wherein the method further comprises:
    the second terminal device discarding the second data portion of the configuration data or update data transmitted via the first spontaneous wireless communication connection by the first terminal device after determining that the second terminal device had the second data portion prior to receiving that second data portion from the first terminal device via the first spontaneous wireless communication; and
    the second terminal device determining that the second terminal device has all of the data set of the configuration data or update data prior to installing the configuration data or the update data.

4. The method as claimed in claim 2, further comprising the second terminal device starting an installation setup in response to receiving the configuration data or update data.

5. The method as claimed in claim 2, wherein establishing the first spontaneous communication connection includes a security check.

6. The method as claimed in claim 5, wherein a signature of the central device or a device manufacturer is transmitted to establish the first and second spontaneous communication connections to enable a security check.

7. The method as claimed in claim 6, wherein the first and second spontaneous communication connections are is established via Bluetooth, wireless USB or WLAN.

8. The method of claim 1 wherein each terminal device is a mobile telephone.

9. The method of claim 8 wherein the communicatable distance is a distance sufficient to permit the first terminal device to directly communicate and wirelessly communicate with the second terminal device.

10. A data network, comprising:
a first terminal device, a second terminal device, and a third terminal device that are each ad hoc capable;
a central device for the distribution of data; the central device configured to transmit update data or configuration data to the first terminal device; and
the first terminal device configured to establish a wireless spontaneous communication connections with the second terminal device and the third terminal device after the first terminal device receives the update data or configuration data from the central device and subsequently is within a communicatable distance of the second terminal device and the third terminal device, the update data or configuration data being transmitted directly from the first terminal device to the second terminal device via a respective one of the wireless spontaneous communication connections and being directly transmitted from the first terminal device to the third terminal device via a respective one of the wireless spontaneous communication connections; and
the second terminal device and the third terminal device being configured to install the update data or configuration data after receiving the update data or configuration data from the first terminal device via the spontaneous wireless communication connections.

11. The data network as claimed in claim 10, wherein the update data or configuration data is automatically transferred from the first terminal device to the second terminal device when both the first terminal device and the second terminal device establish the spontaneous wireless communication connection.

12. The data network as claimed in claim 11, wherein the update data or configuration data is software, and wherein an installation of the update data or configuration data by the second terminal device is automatically started after the second terminal device completely received the update data or configuration data.

13. The data network as claimed in claim 11, wherein the update data or configuration data is configuration data, and wherein a setup using the configuration data is automatically initiated by the second terminal device after the second terminal device has completely received the configuration data from the first terminal device.

14. The data network as claimed in claim 11, wherein the spontaneous wireless communication connection between the first terminal device and the second terminal device is established via Bluetooth, wireless USB or WLAN.

15. The data network as claimed in claim 14, further comprising a security device by which the spontaneous wireless communication connection is called up.

16. The data network as claimed in claim 15, wherein a signature of the central device or a device manufacturer is transmitted to establish the wireless spontaneous communication connection.

17. The data network of claim 14 wherein each terminal device is a mobile telephone.

18. The data network of claim 17 wherein the communicatable distance is a distance sufficient to permit the first terminal device to directly communicate and wirelessly communicate with the second terminal device.

* * * * *